United States Patent
Iraschko

(10) Patent No.: US 7,748,505 B2
(45) Date of Patent: Jul. 6, 2010

(54) BRAKE PAD WITH A TYPE PLATE

(75) Inventor: Johann Iraschko, Schweitenkirchen (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 108 days.

(21) Appl. No.: 11/783,743

(22) Filed: Apr. 11, 2007

(65) Prior Publication Data

US 2008/0047791 A1 Feb. 28, 2008

Related U.S. Application Data

(63) Continuation of application No. PCT/EP2005/010753, filed on Oct. 6, 2005.

(30) Foreign Application Priority Data

Oct. 11, 2004 (DE) .................. 10 2004 049 657

(51) Int. Cl.
*F16D 65/00* (2006.01)

(52) U.S. Cl. ................ 188/250 B; 188/250 G

(58) Field of Classification Search ............ 188/250 B, 188/250 G; 40/911, 912; D12/180
See application file for complete search history.

(56) References Cited

U.S. PATENT DOCUMENTS

| 1,492,633 | A | * | 5/1924 | Heywood | ............... 29/527.5 |
| 4,628,855 | A | * | 12/1986 | Nishida | ............... 114/364 |
| 5,285,873 | A | * | 2/1994 | Arbesman | ............... 188/73.1 |
| 5,353,896 | A | | 10/1994 | Baumgartner et al. | |
| 5,799,754 | A | | 9/1998 | Kazuro et al. | |

FOREIGN PATENT DOCUMENTS

| DE | 24 05 379 A1 | 8/1975 |
| DE | 35 16 264 A1 | 6/1986 |
| EP | 0 429 110 A1 | 5/1991 |
| EP | 0 531 321 | 12/1991 |
| EP | 0 679 817 A1 | 11/1995 |
| EP | 0 882 905 A2 | 12/1998 |
| WO | WO 91/19115 A1 | 12/1991 |

OTHER PUBLICATIONS

International Search Report dated Jan. 18, 2006 w/English translation (four (4) pages).
Form PCT/ISA/237 w/English translation (twelve (12) pages).

* cited by examiner

*Primary Examiner*—Bradley T King
(74) *Attorney, Agent, or Firm*—Crowell & Moring LLP

(57) ABSTRACT

A brake pad with markings for different types of brakes is described. A passage or a recess is provided in the brake pad carrier of the brake pad, wherein a badge is inserted. The badge is made of a material which is less firm than the brake pad carrier, such that information can be placed thereon using a stamping method.

20 Claims, 1 Drawing Sheet

BRAKE PAD WITH A TYPE PLATE

CROSS REFERENCE TO RELATED APPLICATIONS

This application is a continuation of PCT International Application No. PCT/EP2005/010753, filed Oct. 6, 2005, which claims priority under 35 U.S.C. §119 to German Patent Application No. 10 2004 049 657.9, filed Oct. 11, 2004, the entire disclosures of which are herein expressly incorporated by reference.

BACKGROUND AND SUMMARY OF THE INVENTION

The invention relates to a brake pad for a disk or drum brake, which brake pad is composed of a brake pad carrier and a brake material layer which is fixed thereto and which, during a braking operation, comes into contact with a brake face of the brake.

The braking action is based on the friction effect since, during the braking process, the brake pads are pressed against the brake face. In the case of a disk brake, the brake face is a disk which rotates with the wheel, while in the case of a drum brake, the brake pads which are configured in the shape of segments are pressed against the inner face of the brake drum. The brake material layer is formed into a slab in the case of a disk brake, and into a circular segment in the case of a drum brake.

Brakes are safety-relevant components, and therefore quality control of the components of a brake is an important aspect. For safety reasons, it is additionally necessary to check the brake pads at predefined intervals. It is additionally extremely important that the production process, in particular of the brake material layer, can be traced at any time. For this reason, the brake calipers or the brake housings are normally provided with type plates. It is important that the identification features remain readable even after a relatively long period of use of the vehicle. The type plates are preferably produced from a corrosion-resistant material and are, where possible, attached to protected points of the brake or of the vehicle.

The brake material layers are produced from a non-magnetic material whose friction coefficient is relatively high in order to obtain a high braking force. The brake material layer is attached to the brake pad carrier during the course of production. The brake pad carrier is conventionally produced from steel.

In the case of the brake pads according to exemplary embodiments of the invention, the designation of the brake pad is stamped onto a pad carrier plate. The precise batch designation of the brake material layer is, in contrast, often only printed on, since such batch designation is only established once the brake material has been pressed onto the support plate, and embossing is then not possible, since there is the risk of the brake pad carrier bending, which could cause the brake material layer to become detached.

It has been shown that the printed-on batch designation of the brake material layer is often no longer readable or not even present after just a short period of use on the vehicle, in particular where the brake pads are subjected to relatively high thermal loading or vibration loading. One practice which is conventionally already used is to record the precise batch designation of the brake material layer by a so-called "needling-on" operation. However, the above-specified problem is still present even with this method, since the individual needle points cannot be formed very deep into the material, and can therefore disappear under the action of corrosion or friction.

In order to solve the above-stated problem, one may wish to have a plate designed in the manner of a type plate to likewise be attached to the brake pad. A plate of this type cannot, however, be attached to the surface of the brake pad carrier, since that face is required, at least in the case of a disk brake, for introducing the application force. In addition, a plate which is attached in such an exposed manner would not be protected from damage.

The following exemplary embodiments of the invention include configuring a brake pad such that the precise batch designation of the brake material layer is readable over the entire service life of the brake.

In one example, the brake pad carrier is provided with an aperture, or with a cutout which is situated on that side which faces toward the brake material layer, into which is inserted a badge which displays pad-specific information.

The cutout or the aperture which is formed in the brake pad carrier makes it possible for the badge to be attached at a protected position, so that the badge is not subjected to any damage. In this way, the contained information, for example numbers and/or letters, is readable at all times. The production of the aperture or of the cutout can take place in a simple manner during the manufacturing process in the course of the production of the brake pad. Since the badge is situated within the brake pad carrier, it is accommodated at a protected position, so that no wear or damage occurs. The cost expenditure is negligible, since the material requirement for the badge is extremely low.

A brake for which the pads according to the invention are particularly suitable is presented by EP 0 531 321.

In one preferred embodiment, the badge is embodied as an embossed badge. The information to be displayed is then formed by a generally known embossing process, with the highest possible depth being possible for the numbers and letters and any necessary symbols. The embossing process can likewise be introduced in the simplest possible manner into the manufacturing process of the production of the brake pad. Conventional equipment can be used for the embossing process, since it is provided that the hardness of the badge material is lower than the hardness of the brake pad carrier.

The service life of the brake pads of a vehicle, in particular of a commercial vehicle, is relatively high. In order that the information on the badge can be easily read after a relatively long period of use, it is provided that the badge is composed of a corrosion-resistant and temperature-resistant material. A material of that type may be, for example, aluminum.

In one example, the brake pad carrier may be provided with a cutout, having a depth great enough that the badge is situated completely within the cutout, that is to say the elevations which are situated facing toward the brake material layer project beyond the contact face, between the brake pad carrier and the brake material layer, toward the interior of the brake pad carrier. In exemplary embodiments where the brake pad carrier is, in contrast, provided with an aperture, the aperture should be of stepped design, with the greatest cross section being situated facing toward the brake material layer. This exemplary arrangement defines a contact face for the edge region of the badge. Although the edge region may also be fixed to the contact face, for example by using adhesive bonding, this is not strictly necessary, since a closed chamber is formed as a result of the stepped design of the aperture.

Other objects, advantages and novel features of the present invention will become apparent from the following detailed description of the invention when considered in conjunction with the accompanying drawings.

BRIEF DESCRIPTION OF THE DRAWINGS

The invention is explained in greater detail on the basis of the appended drawings, in which.

DETAILED DESCRIPTION OF THE DRAWINGS

Figure 1:
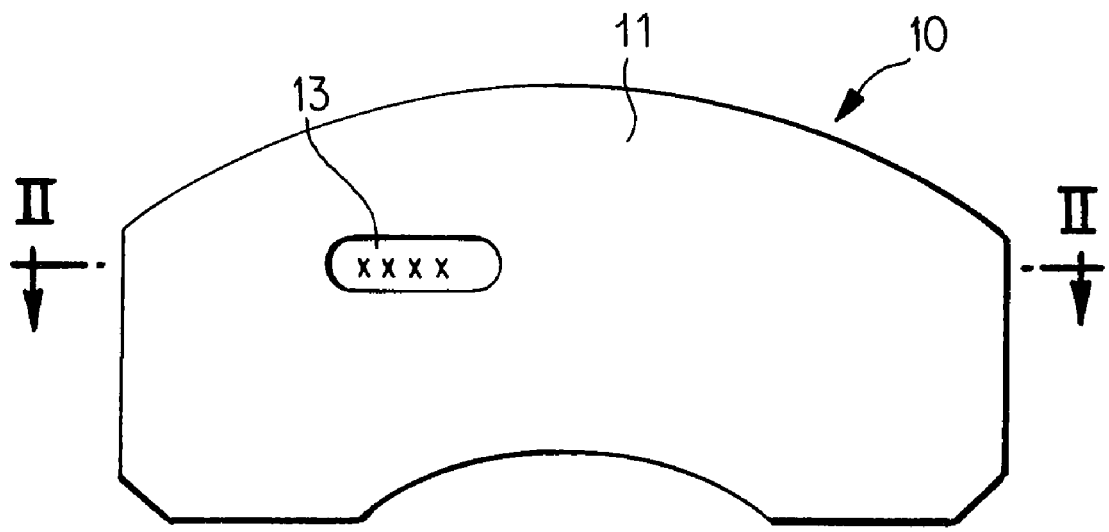
FIG. 1 shows a brake pad carrier in an end view with a view of the contact face to the brake pad.
Figure 2:
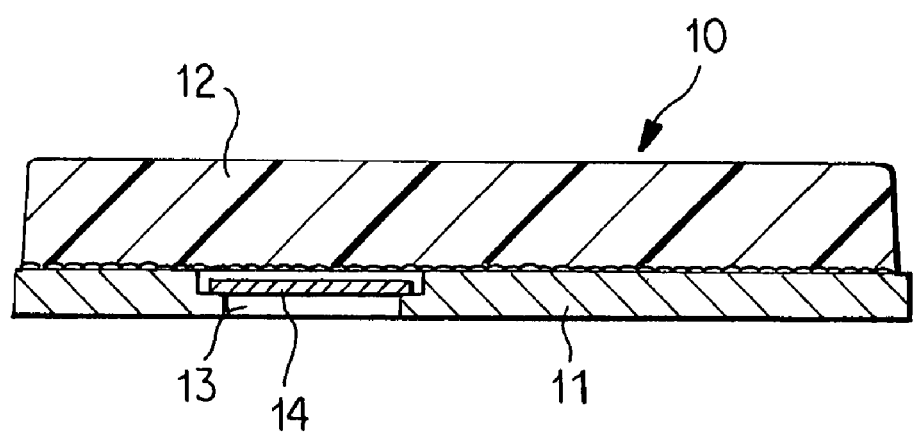
FIG. 2 shows a section along the line II-II shown in FIG. 1.

The exemplary brake pad 10 illustrated in the figures is configured in the shape of a slab, and is designed for a disk brake. As discussed above, the embodiments of the invention may be used in other types of brakes, such as in drum brakes. The brake pad 10 is composed of a slab-shaped brake pad carrier 11, which is conventionally produced from steel, and a brake material layer 12 with a high friction coefficient. The brake pad carrier 11 is connected in a known way to the brake material layer 12. The brake pad carrier 11 is, in the illustrated exemplary embodiment, equipped with an aperture 13 which is configured in the shape of a slot as per FIG. 1. FIG. 2 shows that the aperture 13 is of stepped design, with the larger cross section situated facing toward the brake material layer 12. Placed in the aperture 13 is a badge 14 whose edge regions are supported on the contact face. The badge 14 can contain the necessary information, as indicated by the characters in FIG. 1. The information normally displays the precise batch designation of the brake material layer 12. The edge regions of the badge 14 can be fixedly connected to the contact face of the aperture 13, for example by using an adhesive layer. In another exemplary embodiment, the brake pad carrier 11 may be provided with a cutout, with it being necessary for the depth to be great enough that the badge 14 is situated completely within the cutout.

The illustrated exemplary brake pad 10 is designed for a disk brake. If another exemplary brake pad is to be used for a drum brake, the brake pad carrier 11 and the brake material layer 12 may be configured in the shape of a circular segment.

The invention is not restricted to the illustrated exemplary embodiment. According to the invention, an aperture 13 or a cutout for holding the badge 14 is provided in the brake pad carrier 11. The badge 14 is composed of a material such that the badge 14 is, in itself, dimensionally stable.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A brake pad for a brake, comprising:
a brake pad carrier;
a brake material layer fixed to the brake pad carrier and which, during a braking operation, comes into contact with a brake face of the brake;
an aperture extending through the brake pad carrier, an opening at one end of the aperture facing the brake material layer; and
a badge located within the aperture and attached to the brake pad carrier to maintain a clearance from the brake material layer, said badge displaying pad-specific information through an opening of the aperture at another end facing away from the brake material layer.

2. The brake pad as claimed in claim 1, wherein the badge is an embossed badge.

3. The brake pad as claimed in claim 2, wherein a hardness of a material forming the badge is lower than an hardness of the brake pad carrier.

4. The brake pad as claimed in claim 1, wherein the badge is formed of a corrosion-resistant and temperature-resistant material.

5. The brake pad as claimed in claim 3, wherein the brake pad carrier is composed of steel, and the badge is composed of aluminum.

6. The brake pad as claimed in claim 1, further comprising a stepped design portion of the aperture in the brake pad carrier forming a contact face for an edge region of the badge.

7. The brake pad as claimed in claim 1, wherein the aperture is configured in the shape of a slot.

8. The brake pad as claimed in claim 1, wherein the aperture comprises a cutout of the brake pad carrier.

9. The brake pad as claimed in claim 1, wherein the brake pad is for use in one of a disk brake and a drum brake.

10. A braking system component, comprising:
a brake pad carrier;
a brake material layer attached to the brake pad carrier, frictionally engaging a brake face during braking; and
a badge displaying pad-specific information attached to the brake pad carrier,
wherein the brake pad carrier comprises an aperture extending through the brake pad carrier so as to face the brake material layer, the badge being located therein with a clearance from the brake material layer.

11. The component according to claim 10, wherein the aperture comprises stepped sides forming contact surfaces for retaining the badge.

12. The component according to claim 10, wherein the badge is made of a material having a lower hardness than a material of the brake pad carrier.

13. The component according to claim 10, wherein the badge is made of aluminum and the brake pad carrier is made of steel.

14. The component according to claim 10, wherein the aperture receives the badge in a protected position in the brake pad carrier.

15. The component according to claim 10, wherein the aperture has sufficient depth to completely receive the badge therein.

16. The component according to claim 10, wherein the badge is formed of a temperature and corrosion resistant material.

17. The component according to claim 11, wherein the stepped sides of the aperture provide a greatest cross section thereof nearest to the brake material layer.

18. A method of forming a brake pad, comprising the acts of:
providing a brake pad carrier made of a first material;
forming an aperture through the brake pad carrier, the aperture extending from a first opening on a first surface to a second opening on a second surface of the brake pad carrier;
inserting a badge, having pad-specific information, formed of a second material that is less hard than the first material, into the aperture through the second opening so as to display the pad-specific information through the first opening; and
affixing a brake material layer to the second surface of the brake pad carrier, wherein a clearance is maintained from the badge.

19. The method according to claim 18, further comprising securing the badge with stepped retaining surfaces of the aperture.

20. The method according to claim 18, further comprising forming the badge of aluminum and the brake pad carrier of steel.

* * * * *